H. L. BIEGERT.
CARRIER ATTACHMENT FOR AUTOMOBILES.
APPLICATION FILED SEPT. 18, 1916.

1,243,034.

Patented Oct. 16, 1917.

Witnesses.
H. L. Opsahl.
E. C. Wells.

Inventor
H. L. BIEGERT
By his Attorneys
Williamson Merchant

UNITED STATES PATENT OFFICE.

HERMAN L. BIEGERT, OF MONTEVIDEO, MINNESOTA.

CARRIER ATTACHMENT FOR AUTOMOBILES.

1,243,034. Specification of Letters Patent. Patented Oct. 16, 1917.

Application filed September 18, 1916. Serial No. 120,639.

*To all whom it may concern:*

Be it known that I, HERMAN L. BIEGERT, a citizen of the United States, residing at Montevideo, in the county of Chippewa and State of Minnesota, have invented certain new and useful Improvements in Carrier Attachments for Automobiles; and I do hereby declare the following to be a full, clear, and exact description of the invention, such as will enable others skilled in the art to which it appertains to make and use the same.

My invention has for its object to provide a carrier attachment for automobiles; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a fragmentary side elevation of an automobile, having the improved carrier attachment secured thereto with a part of said carrier shown in a different position by means of broken lines, and diagrammatically illustrating by means of broken lines a pneumatic tire held by said carrier;

Figures 1, 2, 3, 4:
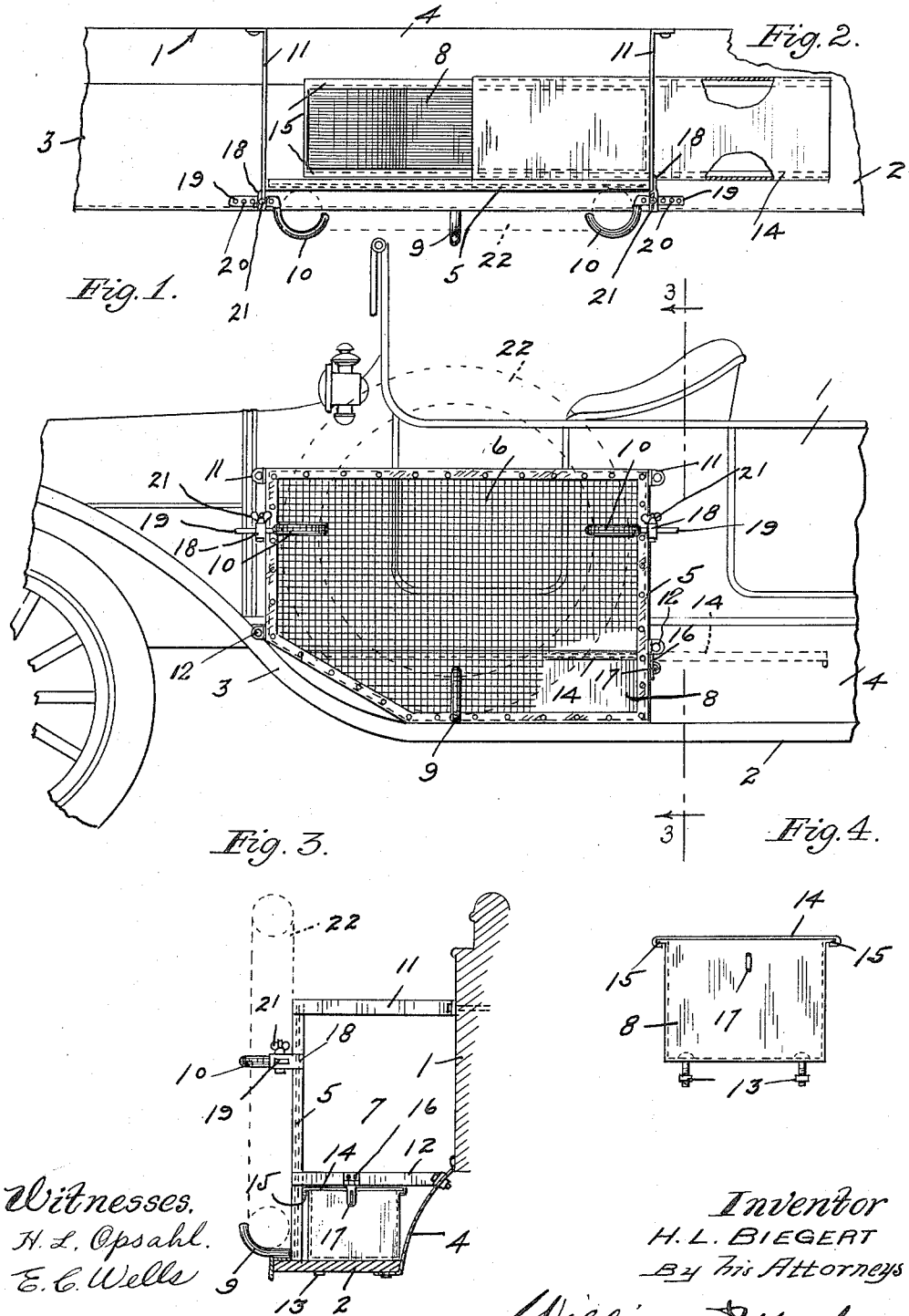
Fig. 2 is a fragmentary plan view with the top of the box partly open.
Fig. 3 is a transverse vertical section taken on the line 3—3 of Fig. 1.
Fig. 4 is a rear end elevation of the box removed from the automobile.

Of the parts of the automobile illustrated, for the purpose of showing the invention applied in working position, it is only necessary to note the body 1, running board 2, front fender 3 and running board guard 4.

The improved carrier attachment comprises a marginal frame 5 having a reticulate panel 6 spaced apart from the body 1 of the automobile to afford therebetween a baggage receptacle 7, a box 8 and a pneumatic tire holder comprising a supporting hook 9 and a pair of adjustable hook-like holders 10.

The frame 5 is supported in an upright position on the running board 2, with its forward end portion extending onto the fender 3. A pair of upper arms 11 rigidly and detachably connect the upper corners of the frame 5 to the body 1 and a pair of lower arms 12 connect said frame to the guard 4. The arms 11 and 12 are secured to the body 1 and guard 4, respectively, by means of screws or bolts, so that the attachment may be removed from the automobile, at will. The box 8 is detachably secured by bolts 13 to the running board 2 and its forward end is shaped to extend part way up onto the fender 3. This box 8 is located just under the arms 12 and the top 14 thereof affords the bottom of the receptacle 7. The box 8 is preferably made of sheet metal and is made watertight, at its top, by forming on its upper longitudinal edges flanges 15, with which the sliding cover 14 interlocks.

The cover 14 is secured in a closed position on the box 8 by a hasp 16, having a hinge joint, secured to the rearmost arm 12 and arranged to interlock with a staple 17 on the rear end of the box 8. A pin or padlock, not shown, may be provided for securing the hasp 16 interlocked with the staple 17. The box 8 may be used as a commissary box and by making holes in the bottom thereof, ice may be placed therein. This box 8 may also be used for carrying gun shells or various other articles.

If desired, end boards may be provided for the receptacle 7. All kinds of baggage may be carried in the receptacle 7 and, in actual usage of the carrier attachment, said receptacle has been used for carrying a hunting dog. The hook 9 of the tire carrier is rigidly secured to the bottom member of the frame 5 and the hook-like holders 10 thereof are mounted in brackets 18, rigidly secured to the uprights of the frame 5. As shown, these hook-like holders 10 are provided with oppositely projecting arms 19 mounted for horizontal sliding movement in apertures formed in the brackets 18. The arms 19 are provided with a multiplicity of longitudinally spaced bores 20 to receive thumb nut-equipped bolts 21 in the brackets 18 and hold the hook-like holders 10 in different adjustments toward and from each other. The tire holder 9—10 is arranged to support a pneumatic tire 22, diagrammatically illustrated by means of broken lines, in an upright position against the outer face of the frame 5.

By mounting the improved carrier attachment on the automobile, as shown, the same does not occupy any room that could otherwise be used. The carrier attachment has a very neat appearance and the reticulate panel makes the same very inconspicuous and, at a distance, is hardly noticeable. As previously stated, the carrier attachment can be very quickly applied to an automobile or removed therefrom. While the improved carrier attachment is especially adapted for automobiles carrying hunting, fishing, camping and touring parties, in carrying their necessary baggage and provisions, it can be used for carrying all kinds of baggage that would otherwise crowd the seating capacity of the car.

What I claim is:—

1. The combination with an automobile having a running board, the inner longitudinal edge of which is spaced outward of and below the body of the automobile, and a guard between said body and running board, of a carrier attachment comprising an upright frame supported on the running board, an end member securing the frame to said body and holding the same spaced apart therefrom to afford a baggage receptacle therebetween, and a box on the running board, the cover of which is substantially in the plane of the bottom of said body and affords the bottom of the baggage receptacle.

2. The combination with an automobile having a running board, the inner longitudinal edge of which is spaced outward of and below the body of the automobile, and a guard between said body and running board, of a carrier attachment comprising an upright frame supported on the running board, an end member securing the frame to said body and holding the same spaced apart therefrom to afford a baggage receptacle therebetween, and a box on the running board having a sliding cover arranged to move under said end member, said cover being in substantially the same plane as the bottom of said body and affording the bottom of the baggage receptacle.

3. The combination with an automobile having a running board, the inner longitudinal edge of which is spaced outward of and below the body of the automobile, and a guard between said body and running board, of a carrier attachment comprising an upright frame supported on the running board, an end member securing the frame to said body and holding the same spaced apart therefrom to afford a baggage receptacle therebetween, a box on the running board having a sliding cover arranged to move under said end member to and from a closed position, said cover being in substantially the same plane as the bottom of said body and affording the bottom of the baggage receptacle, and a lock securing the box to the carrier attachment and its cover in a closed position.

In testimony whereof I affix my signature in presence of two witnesses.

HERMAN L. BIEGERT.

Witnesses:
GILBERT A. ANDERSON,
ANTON J. FRISHOLM.